US008028987B2

(12) United States Patent
Auf Der Maur

(10) Patent No.: US 8,028,987 B2
(45) Date of Patent: Oct. 4, 2011

(54) METHOD AND DEVICE FOR THE SEPARATION OF SINGLE FLAT ARTICLES FROM A LYING STACK

(75) Inventor: Konrad Auf Der Maur, Gossau (CH)

(73) Assignee: Ferag AG, Hinwil (CH)

( * ) Notice: Subject to any disclaimer, the term of this patent is extended or adjusted under 35 U.S.C. 154(b) by 207 days.

(21) Appl. No.: 11/225,560

(22) Filed: Sep. 13, 2005

(65) Prior Publication Data

US 2006/0071394 A1   Apr. 6, 2006

(30) Foreign Application Priority Data

Sep. 15, 2004  (CH) ........................................ 1511/04

(51) Int. Cl.
*B65H 5/08* (2006.01)
(52) U.S. Cl. ............ 271/12; 271/91; 271/31.1; 271/277
(58) Field of Classification Search .................... 271/12, 271/91, 31.1, 277
See application file for complete search history.

(56) References Cited

U.S. PATENT DOCUMENTS

| | | | | | |
|---|---|---|---|---|---|
| 3,937,458 | A | * | 2/1976 | Langen | 271/95 |
| 4,127,262 | A | * | 11/1978 | Eberle et al. | 271/12 |
| 4,205,837 | A | * | 6/1980 | von Hein et al. | 271/270 |
| 4,537,587 | A | * | 8/1985 | Langen | 493/315 |
| 4,566,687 | A | * | 1/1986 | Faltin | 271/202 |
| 4,569,284 | A | * | 2/1986 | Witczak | 101/183 |
| 4,580,473 | A | * | 4/1986 | Seiden et al. | 83/23 |
| 4,605,213 | A | * | 8/1986 | Hechler | 270/52.3 |
| 4,799,664 | A | * | 1/1989 | Burger | 271/277 |
| 4,893,805 | A | * | 1/1990 | Eberle | 271/204 |
| 4,905,985 | A | * | 3/1990 | Nagatani | 271/277 |
| 4,971,310 | A | * | 11/1990 | Motegi et al. | 271/126 |
| 5,027,586 | A | * | 7/1991 | Ramaker | 53/458 |
| 5,054,761 | A | * | 10/1991 | Dietrich et al. | 271/95 |
| 5,503,519 | A | * | 4/1996 | Schwetz et al. | 414/798.9 |
| 5,511,772 | A | * | 4/1996 | Ganz et al. | 271/12 |
| 5,649,483 | A | * | 7/1997 | Mack et al. | 101/232 |
| 5,785,310 | A | * | 7/1998 | Kohn | 271/13 |
| 6,454,255 | B1 | * | 9/2002 | Allen et al. | 271/176 |
| 6,494,310 | B1 | | 12/2002 | Furter | |
| 6,503,180 | B1 | | 1/2003 | Pluschow et al. | |
| 6,575,886 | B1 | * | 6/2003 | Tanck et al. | 493/81 |
| 6,659,928 | B2 | * | 12/2003 | Baumeister et al. | 493/315 |
| 7,017,640 | B2 | * | 3/2006 | Winter et al. | 156/562 |
| 2002/0129893 | A1 | * | 9/2002 | Winter et al. | 156/283 |

OTHER PUBLICATIONS

WO 02/30753 A1, Arrangement in a Packaging Machine and a Method, Publication Date: Apr. 18, 2002.

* cited by examiner

*Primary Examiner* — Michael McCullough
(74) *Attorney, Agent, or Firm* — Rankin, Hill & Clark LLP

(57) ABSTRACT

For separating flat articles from a lying stack of articles, each foremost article of the stack is conveyed away one after the other in an upwards direction. For making such separation applicable also for mechanically relatively unstable articles, a preparatory step is implemented prior to the step of conveying-away upwards. In this preparatory step each foremost article of the stack is gripped, then separated from the front end of the stack in a direction essentially perpendicular to the main surfaces of the stacked articles and simultaneously or immediately afterwards accelerated upwards. Only when the article has a speed component in upwards direction of approximately the order of magnitude of the conveying-away speed is the article transferred to the conveying-away means. The preparatory step is carried out with a suction device that moves on a suction device track.

16 Claims, 5 Drawing Sheets

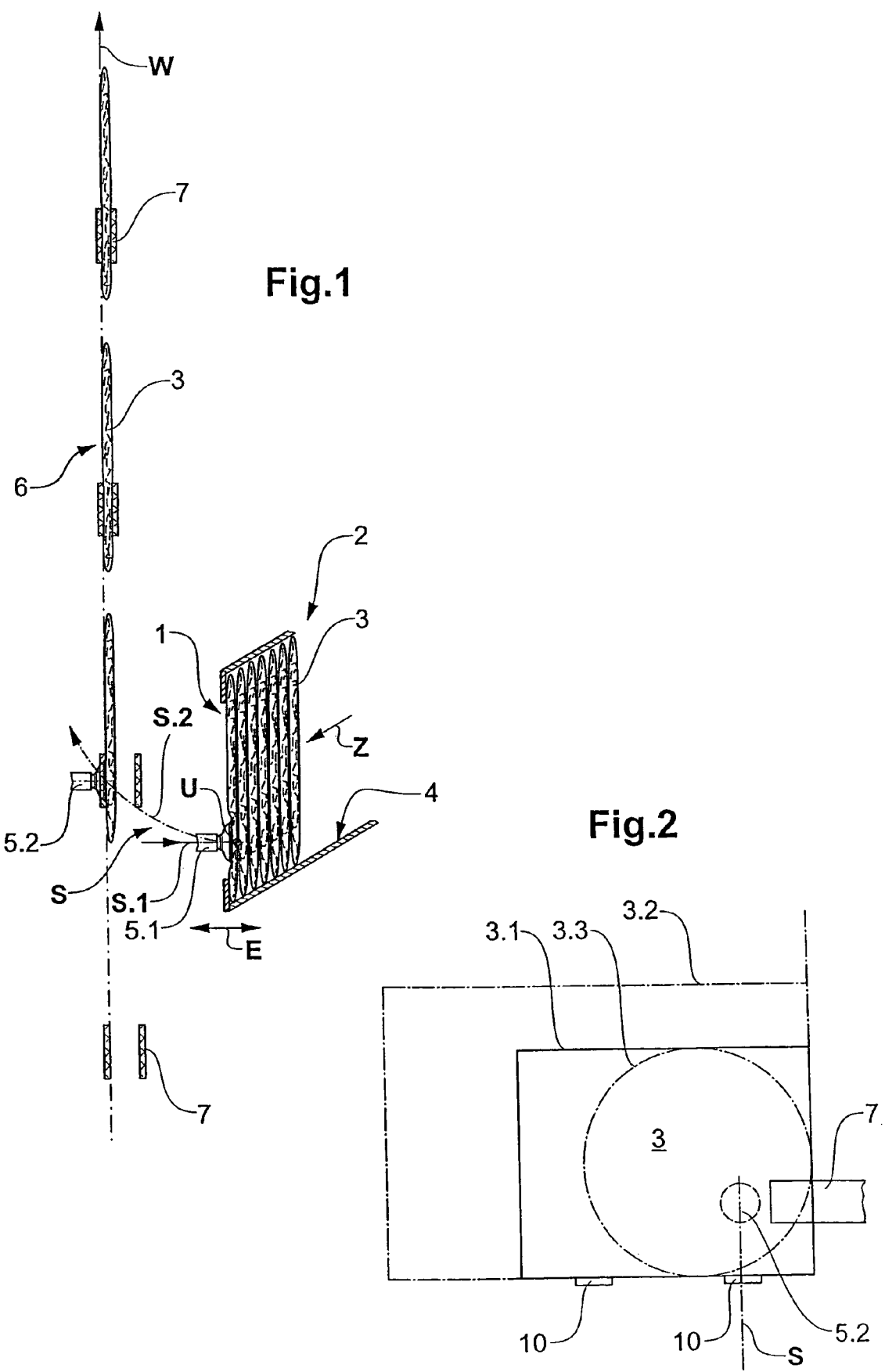

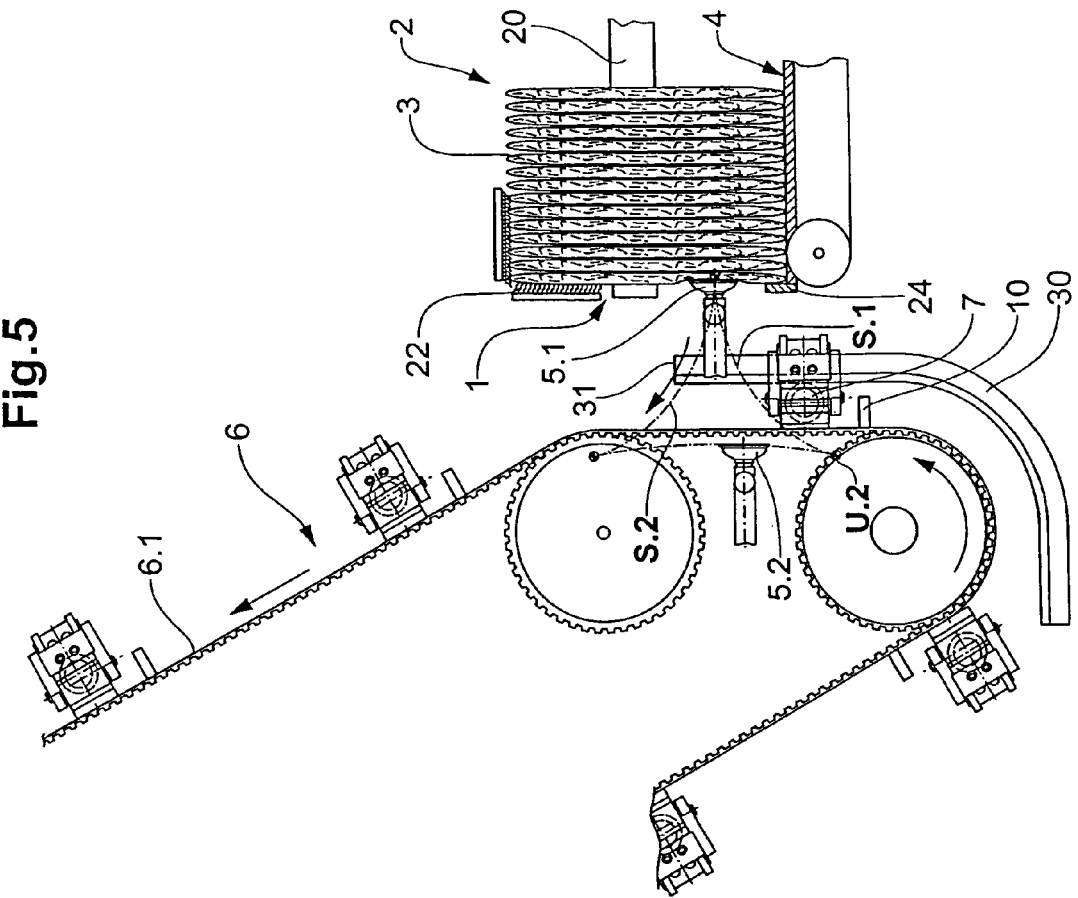
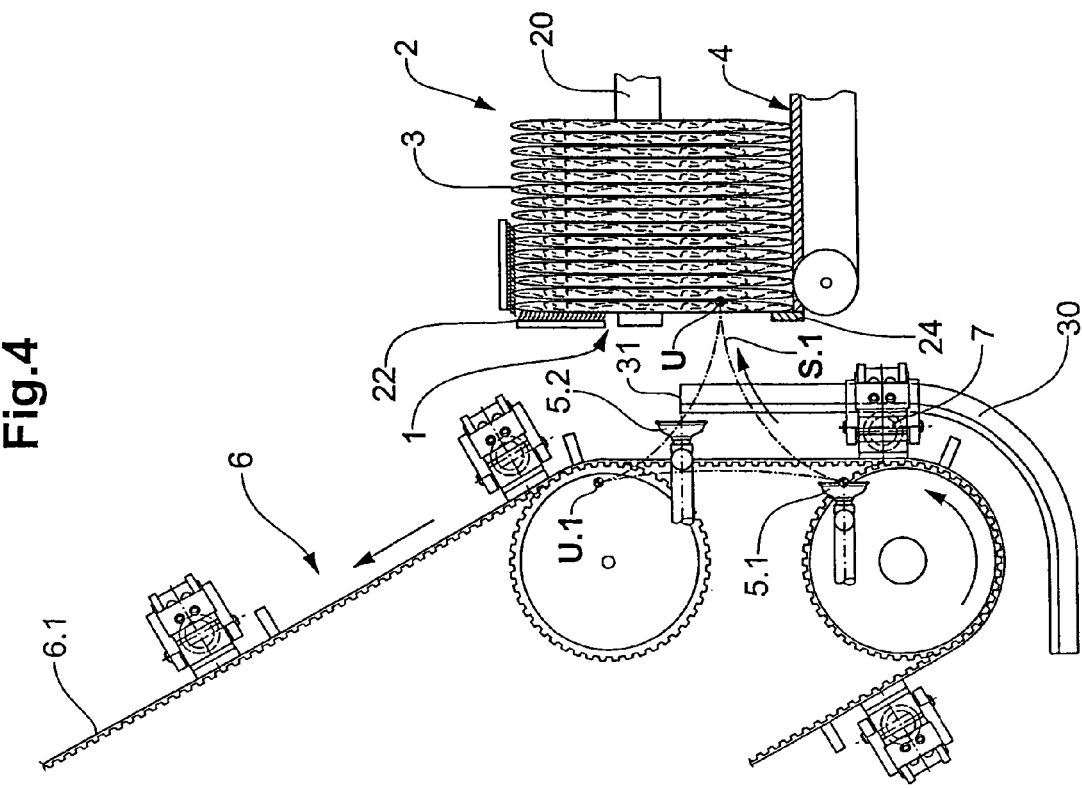

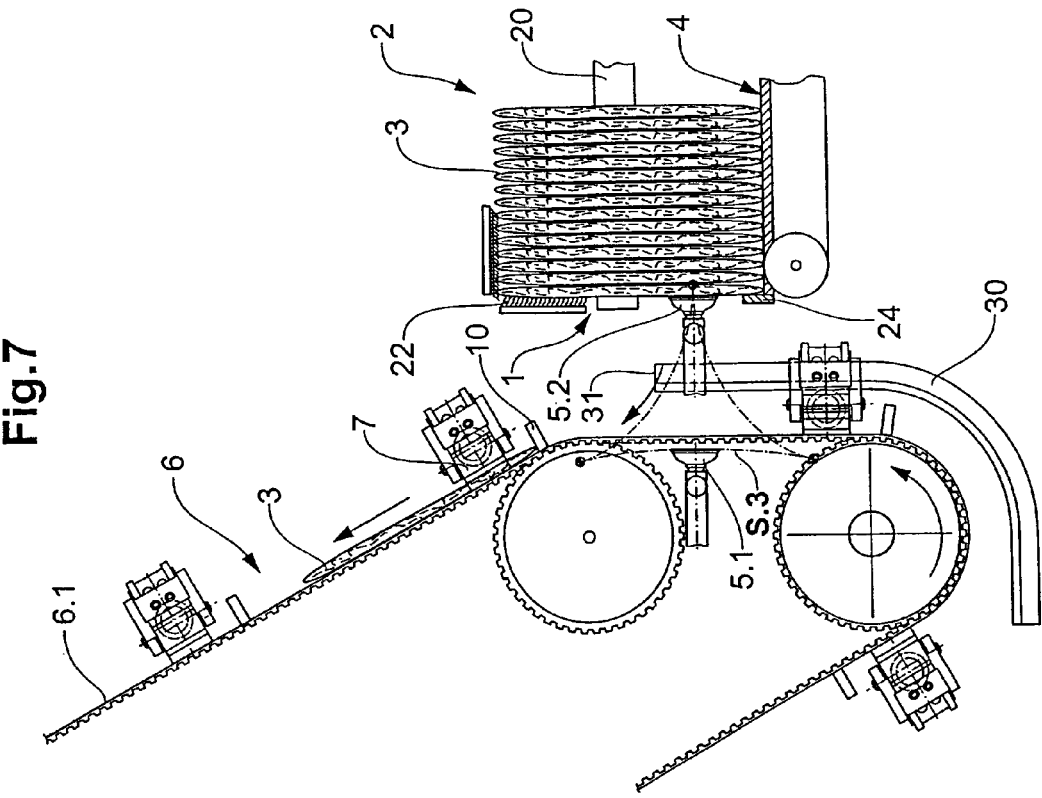
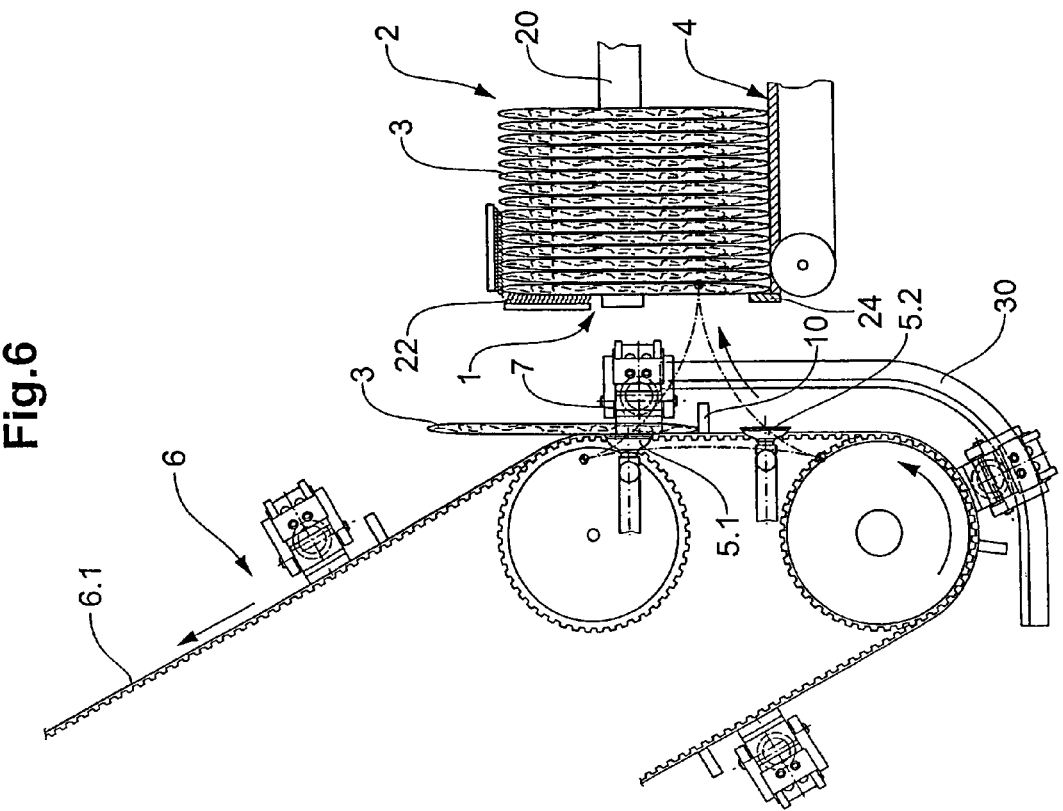

METHOD AND DEVICE FOR THE SEPARATION OF SINGLE FLAT ARTICLES FROM A LYING STACK

FIELD OF THE INVENTION

The invention is situated in the field of unit load handling and it relates to a method and a device which serve for the separation of single flat articles from a lying stack of the articles.

The expression "lying stack" hereinafter shall be understood to signify a multitude of flat articles, which are lined-up densely together, each one standing with one edge on a horizontal or inclined (e.g., slightly sloping downwards) stack support with their main surfaces essentially parallel. For separating single articles from a stack of this kind, articles are removed from the front end of the stack one after the other, wherein this front end of the stack is kept stationary by suitable stack feeding.

BACKGROUND OF THE INVENTION

A device for separating single flat articles from a lying stack is known, for example, from the publication U.S. Pat. No. 6,494,310. This device comprises a rotating suction wheel arranged at the front end of the stack support, on which the flat articles are standing.

The circumferential surface of the suction wheel moves upwards (parallel to the main surfaces of the stacked articles) immediately in front of the front end of the stack. The one article constituting the front end of the stack is pushed against the circumferential surface of the suction wheel by the stack feeding system and adheres to the suction wheel by the suction effect, to be lifted off the stack support while sliding relative to the following article. The suction effect on the circumference of the suction wheel is controlled in such a manner, that a following article is only adhered to the wheel and lifted, when the preceding article has already reached a position above the stack. Corresponding measures ensure, that the articles at the front end of the stack are not pressed against one another too strongly in order to prevent high pressure in the stack and therefore high friction between the stacked articles, which may lead to separation of not single articles but of pluralities of articles. This, however, is not desirable as it destabilises the front end of the stack.

In order to keep friction between articles low in the region of the front end of the stack, it is suggested in U.S. Pat. No. 6,494,310 that the article group forming the front end of the stack is isolated regarding pressing force from a rear stack region and that this group of articles is moved towards the front end as a relatively loose stack portion on a slightly downwards sloping and vibrating stack support. By this measure it is ensured, that forces acting in the area of the front end of the stack and pressing the articles against one another and towards the front end remain small and that therefore friction between these articles remains low. This measure enables reliable separation of one article after another with a very simple device.

The device in accordance with U.S. Pat. No. 6,494,310, however, is suitable only for handling relatively stable articles, i.e. articles which are capable of standing upright on one edge in a very loose stack, wherein the stack has to be the looser, the greater the friction coefficient between the articles is. The device further necessitates a mechanical stability of the articles such that they can be accelerated almost instantaneously by the suction wheel, whose circumferential surface moves with a constant speed in a direction essentially perpendicular to the stack support. Sensitive articles may suffer undesirable deformation or even damage, in particular if, for a high separation capacity the rotation speed of the suction wheel is chosen to be high. Furthermore, the suction wheel or control of the suction cycle is to be adapted to the height of the articles above the stack support and if so required also to their width. This means that the suction wheel may have to be physically adapted for the processing of different article formats.

BRIEF DESCRIPTION OF THE INVENTION

It is the object of the invention to create a method and a device for the separation of single flat articles from a lying stack of the articles, wherein, when using the method and the device in accordance with the invention, it shall be possible without any adjustment to handle types of articles, which differ from one another with respect to mechanical rigidity and stiffness and/or format in a much higher degree, than types of articles which can be handled with known devices and methods serving the same purpose.

Separation of single articles from a lying stack in accordance with the invention is based, like known such separation processes, on a step of conveying away each foremost article of the stack in an upwards direction and advantageously with a constant speed. According to the invention, however, a preparatory step is carried out prior to the conveying-away in the upwards direction, in which preparatory step the foremost article is first gripped, the gripped article is then separated from the front end of the stack in a direction essentially perpendicular to its main surfaces, and the separated article is then accelerated upwards, wherein this acceleration starts with the separation or immediately following it. Only when the article has a sufficiently great upwards speed component parallel to its main surfaces, is it taken over by a conveying-away means of a constant speed to be conveyed away further upwards.

Advantageously the article to be separated from the stack is pushed towards the stack while being gripped. By this measure this article is stabilised by the stack for the gripping operation, so that also relatively unstable articles can be securely gripped. Because the gripped article is separated from the stack in a direction transverse to its main surfaces before or during its acceleration in upwards direction, and therefore during separation has no speed component upwards or only a very small one, a friction-induced effect on the separation process is eliminated. This means, that the pressure force in the stack acting against the front end of the stack can be adapted to other circumstances (e.g., inherent stiffness of the articles) independent of the separation process.

For stabilizing the front end of the stack during separation of each foremost article suitable measures are to be implemented.

The preparatory step prior to the conveying away step according to the separation method according to the invention is advantageously carried out by a suction device connected to a controllable suction line, wherein the suction device advantageously comprises an elastically deformable suction lip. The suction device is moved towards the front end of the stack and then away from it along a suction device track, wherein the suction device track comprises a turning point in the zone of the front end of the stack. At least in the immediate vicinity of this turning point the suction device track runs essentially perpendicular to the main surfaces of the stacked articles. The part of the suction device track leading away from the turning point bends continuously or non-continuously upwards. The position of the turning point is selected in such a manner, that the suction device, when positioned at the turning point, is pressed against the foremost article of the stack, so that its suction lip lies tight against this article and the suction device can be evacuated. In place of a single suction device it is also possible to use a plurality of suction devices which act alternatingly. The suction device movement along the suction device track is implemented in an as such known manner, for example, by means of an articulated linkage or a cam mechanism, wherein one or several suction devices may be coupled to a drive mechanism of the named type.

The stack support and the suction device advantageously are arranged relative to one another in such a manner, that separation is as far as possible independent of the format of the articles to be handled. The stack is therefore aligned to a stationary, lateral stop and the suction device contacts the article to be gripped as close as possible to the stack support and the lateral stop, so that it is capable of gripping the smallest articles to be handled, without having to be correspondingly adjusted. As still remains to be demonstrated, the position of the turning point relative to the front end of the stack is advantageously adjustable to the type of article to be handled, which, however, can be implemented with very simple means.

For conveying-away, the articles are, for example, taken over by grippers, wherein the grippers move at a constant speed. Suction device and grippers are synchronised in such a manner, that, during the taking-over operation, the suction device has a speed component in the direction of the gripper movement, which is of a same order of magnitude as the gripper speed, in preference it is slightly lower than the gripper speed. The grippers advantageously grip the article edge, which was aligned at the lateral stop and which therefore has a position independent of the article format, so that the gripper and its track do not have to be adjusted in dependence of the article format.

BRIEF DESCRIPTION OF THE ACCOMPANYING DRAWINGS

The invention is described in detail in connection with the following Figs., wherein:

FIGS. 1 and 2 are schematic diagrams of the method according to the invention;

FIGS. 4 to 7 show the device of FIG. 3, viewed parallel to the main surfaces of the stacked articles in four successive phases of the separation according to the invention;

DETAILED DESCRIPTION OF THE DRAWINGS

Figure 3:
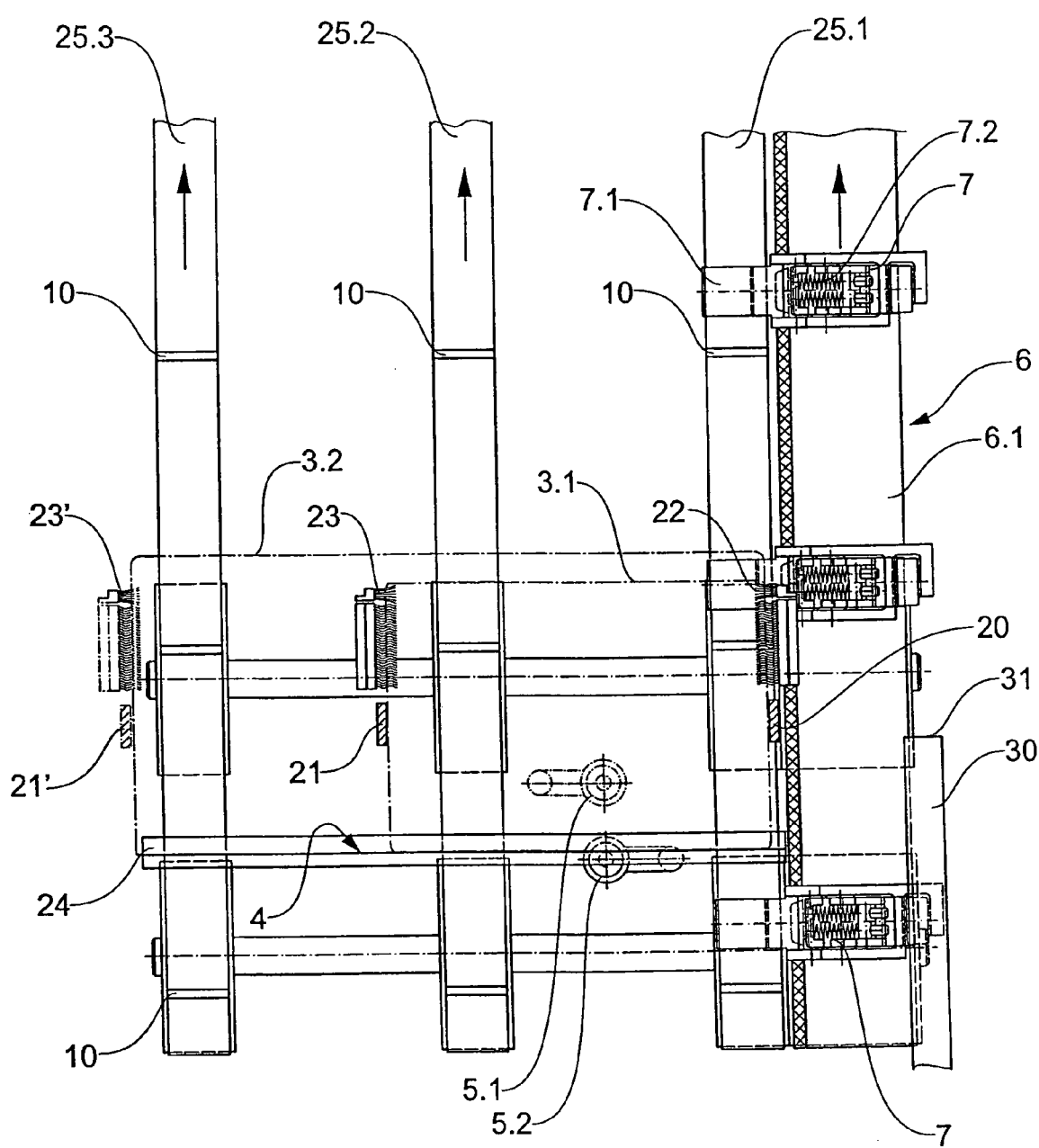
FIG. 3 shows an exemplary device for carrying out the method according to the invention (viewed from the front end of the stack and perpendicular to the main surfaces of the stacked articles)

FIG. 1 shows in a very schematic representation the separation operation according to the invention (viewing direction parallel to the main surfaces of the stacked articles). Depicted are the front end 1 of a lying stack 2 of flat articles 3 on a stack support 4, the flat articles 3 standing on one of their edges on the stack support and the stack support, for example, sloping downwards towards its front end. The flat articles are conveyed in the stack towards the front end 1 of the stack in a feeding direction Z thereby being pushed against one another. Furthermore, two suction devices 5.1 and 5.2 and a convey-ing-away means in the form of a gripper conveyor 6 are shown. The suction devices 5.1 and 5.2 carry out preparatory steps alternatingly (gripping the foremost article, separating it from the stack and accelerating it in upwards direction) and for this purpose they are moved one behind the other along the suction device track S. The gripper conveyor 6 is an example of a conveying-away device and it comprises equidistant grippers 7 moving upwards in the conveying-away direction W.

FIG. 1 represents a snapshot of the operation. The first suction device 5.1 is positioned at the gripping position, this means at the turning point U and it is pressed against the front end 1 of the stack. The first suction device has reached this position through a movement along a first part S.1 of the suction device track, wherein at least the end of this first part S.1 of the suction device track has a direction perpendicular to the main surfaces of the stacked articles 3. In this position the first suction device is evacuated. Through the contact pressure the advantageously elastically deformable suction lip of the suction device is pressed tightly against the article so that it is securely gripped, even if it is soft and/or its surface is uneven.

Following the gripping operation, the first suction device 5.1 together with the gripped article is moved away from the front end 1 of the stack along a second part S.2 of the suction device track, wherein at least the beginning of this suction device track part S.2 once again has a direction essentially transverse to the main surfaces of the stacked articles. Subsequently the second part of the suction device track, bends, for example, continuously (arc-shaped) upwards, wherein the speed component parallel to the main surfaces of the stacked articles is increased (acceleration upwards).

The second suction device 5.2 is illustrated in the transfer position, this means at a point, where the second part S.2 of the suction device track, or the track of the article gripped by the suction device respectively intersects with the track of the conveying-away means (e.g., gripper conveyor 6) and the article is able to be transferred to a gripper 7 correspondingly synchronised with the second suction device 5.2. The upwards speed component of the suction device 5.2 is of a similar magnitude as the speed of the gripper, advantageously somewhat lower, in such a manner, that the gripper 7 catches up from below with the suction device 5.2 prior to the transfer, whereby the article held gripped by the suction device is inserted into the open mouth of the gripper. Thereupon, the gripper 7 is closed and the suction device 5.2 is aerated.

As already mentioned before, the front end of the stack 1 has in operation a stationary position. Because, however, the suction device track S or the turning point U between the first and the second part of the suction device track is advantageously adapted to the consistency of the articles (in FIG. 1, for harder articles more to the left than for softer articles), it is advantageous for a device which is to handle different types of articles, to design the position of the front end 1 of the stack to be adjustable relative to the transfer position (double arrow E). Smaller differences concerning the consistency between types of articles can be compensated for simply by the deformability of the suction lip, i.e. without a corresponding adjustment of the position of the front end of the stack.

FIG. 2 is a view from the front end of the stack and illustrates how the gripper 7, which is laterally offset to the suction device 5.2, grips the article 3 at the one edge which was aligned independent of the article format (lateral stop indicated by the dot-dash line). FIG. 2 also shows lifting cogs 10 which are synchronised with the grippers 7 and moving along tracks parallel to the gripper track. The lifting cogs assist the grippers by supporting the trailing edge, in particular of articles having little stiffness. From FIG. 2 it is also evident, that for a change from a smaller, rectangular type of article 3.1 to a larger, rectangular type of article 3.2 or to a round type of article 3.3 neither the suction devices nor the grippers have to be adjusted.

The suction device track S, of which in FIG. 1 only those parts relevant for the gripping of the article and for its separation and acceleration (end of the first part S.1 and beginning of the second part S.2) are depicted, is advantageously closed in itself in such a manner, that the suction devices following the transfer of a gripped article to be conveyed away are moved once again towards the front end 1 of the stack. FIGS. 4 to 7 illustrate a preferred suction device track S, which is closed in itself.

FIG. 3 shows a preferred embodiment of the device in accordance with the invention in a section parallel to the main surfaces of the stacked articles, wherein the sectional plane is situated behind the front end of the stack and the device is viewed towards the transfer position. FIG. 3 illustrates the stack support 4, the suction devices (5.1 in gripping position and 5.2 on the return track from the transfer position to the gripping position) and, as an exemplary conveying-away means, the gripper conveyor 6 with the grippers 7. FIG. 3 also shows a cam surface 30 controlling the gripper function with a cam end 31 to be discussed further below in connection with FIG. 8. Furthermore, indicated with dot-dash lines, are two types 3.1 and 3.2 of flat articles. These articles are represented in the position of the front end of the stack, therefore standing on edge on the stack support 4, a further edge being aligned on the lateral stop 20.

The device according to FIG. 3 further comprises a counter stop 21 corresponding to the lateral stop 20, as well as stabilizing means acting on different edges or edge zones for the stabilisation of the front end of the stack, here, for example, in the form of lateral brushes 22 and 23 and a foot 24. While the stop 20 and the lateral brush 22 on the format independent stack side fixed, the counter stop 21 and the lateral brush 23 on the opposite stack side are displaceable for different format widths (unbroken line representing positions 21 and 23 for the article type 3.1, dot-dash line representing positions 21' and 23' for the article type 3.2).

For supporting articles being separated from the stack, in particular large articles, which may have an only limited stiffness, it is, as already mention in connection with FIG. 2, advantageous to provide assisting support means for the conveying-away by the grippers 7. In the case presented here, these comprise driven supporting belts 25.1, 25.2 and 25.3, which at least in the illustrated conveying-away zone run parallel to the gripper conveyor 6 and are driven with the same speed. The supporting belts 25.1 to 25.3 may be equipped with lifting cogs 10, which stick out from the belts and which support the trailing (lower) edges of the articles.

The grippers 7 of the device according to FIG. 3 are designed as laterally protruding pressing elements 7.1 driven by a gripper belt 6.1, the pressing elements being designed to be pressed against the supporting belts 25.1 arranged between the suction device and the gripper belts 6.1. In the "closed" condition, the pressing element 7.1 is pressed against the supporting belt or against an article supported by the latter through spring 7.2, in the "open" condition, the pressing element 7.1 is held in a position at a distance from the supporting belt 25.1 by cam 30 and against the closing pressure of spring 7.2. It is understood, that instead of the gripper 7 designed as a pressing element 7.1 it is also possible to use conventional grippers each comprising two clamping jaws capable of being pressed against one another and arranged, for example, on a gripper chain.

FIGS. 4 to 7 show the device of FIG. 3 in a side view (viewing direction parallel to the main surfaces of the stacked articles) in successive phases of the separation operation. Same components are designated with the same reference numerals as in FIG. 3.

In FIG. 4, the first suction device 5.1 is at the beginning of the first part S.1 of the suction device track, i.e. ready to be moved along this first part towards the front end 1 of the stack.

In FIG. 5, the first suction device 5.1 has reached the end of the first part S.1 of the suction device track, i.e. the turning point U. It is in the gripping position, i.e. it is pressed against the foremost article 3, which is to be gripped, and it is evacuated, in order to then be moved together with the gripped article 3 along the second part S.2 of the suction device track, away from the front end 1 of the stack and upwards.

In FIG. 6, the first suction device has reached the transfer position. The gripper 7 synchronised with the suction device is positioned relative to the article to be taken over for the transfer operation (refer to FIG. 2). The same is applicable for the lifting cogs 10 which are synchronised with the gripper 7. The gripper 7 is now closed and immediately afterwards or simultaneously the suction device 5.1 is aerated.

In FIG. 7, the first suction device 5.1 is on the third part S.3 of the suction device track, along which it is moved back into the starting position shown in FIG. 4. The article 3 gripped and held by the gripper 7 and supported by the supporting belts (not visible) and the lifting cogs 10 is conveyed away in an upwards direction.

The second suction device 5.2 moves along the same suction device track S as the first suction device, with a phase shift of 180°. Each suction device therefore carries out the preparatory step on every second article.

FIGS. 4 to 7 illustrate a preferred, closed in itself suction device track S, which is essentially triangular and which, in addition to the turning point U in the zone of the front end 1 of the stack, comprises two further turning points U.1 and U.2, which are at a greater distance from the front end 1 of the stack than the transfer position. Between the turning points U, U.1 and U.2, the suction device track S is arc-shaped, forming as a whole an triangle with isosceles and having concavely curved sides, the zenith of the triangle being the turning point U in the zone of the front end 1 of the stack. Such a suction device track can be implemented, for example, with suction devices, which are coupled to an articulated linkage or a cam mechanism.

As already mentioned further above, other types of suction device tracks are also possible, wherein between the first and the second part of the suction device track there has to be a turning point U, wherein the suction device track immediately before and immediately after the turning point has to extend perpendicular to the main surfaces of the stacked articles 3, and wherein the second part of the suction device track has to extend away from the front end 1 of the stack and upwards.

It can be shown, that with the device as illustrated in FIGS. 3 to 7 relatively unstable flat articles (such as, e.g., textiles enveloped in plastic foil) can be separated with a high capacity in pieces per hour without any problems. With the same device, however it is possible to separate much stiffer articles, such as, for example, CDs without adapting the device, unless adjustment of the turning point U is necessary or desired.

Figure 8:
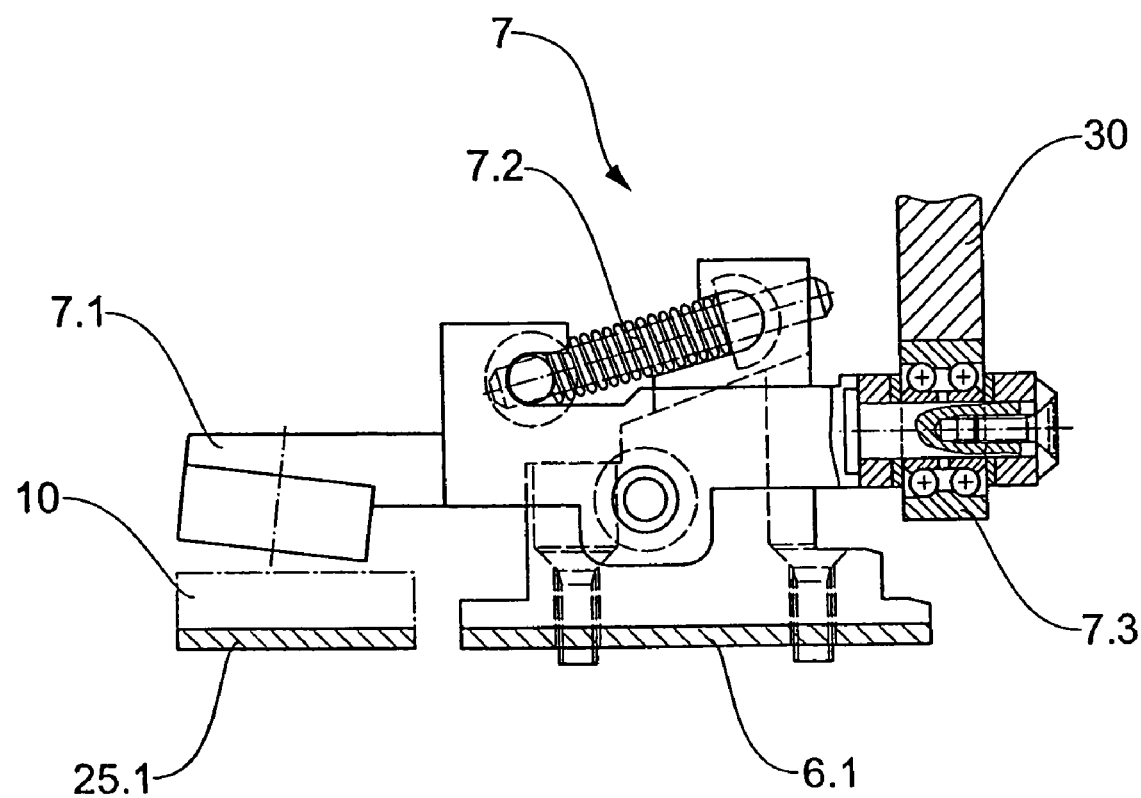
FIG. 8 show an exemplary embodiment of a gripper conveyor for conveying-away the articles after separation from the stack.

FIG. 8 shows the gripper 7 already mentioned in connection with FIG. 3 (viewed in the conveying direction) The gripper is designed as a pressing element 7.1 and is arranged on a gripper belt 6.1. The pressing element 7.1 is pressed against the supporting belt 25.1 by the spring 7.2. FIG. 8 shows the gripper 7 in the open condition, in which the pressing element 7.1 is kept at a distance from the supporting belt 25.1 against the force of spring 7.2 by the controlling roller 7.3 rolling along the correspondingly arranged cam surface 30. Where the cam surface 30 ends (cam surface end 31 in the FIGS. 3 to 7) or extends correspondingly further away from the gripper belt 6.1, the spring 7.2 brings the pressing element back into its pressing position, in which it is pressed against the supporting belt 25.1 or against an article to be conveyed away.

The invention claimed is:

1. A device for separating flat articles from a lying stack, in which the articles stand on one edge lined-up one behind the other with article main surfaces aligned in parallel, the device comprising:
    a stack support (4) configured to support articles in a consistent orientation, standing on one edge and lined-up one behind the other, with main surfaces of the articles aligned in parallel, the stack support having a stationary front end,
    means for feeding the articles towards the front end of the stack support,
    at least one suction device arranged for separating the articles from the stack via attachment to the main surface of an article, the suction device being capable of moving along a suction device track, and
    a gripper conveyor comprising a plurality of grippers arranged for conveying away the articles upward after separation from the stack, and moving in an upward conveying away direction along a gripper track, wherein the gripper track comprises a transfer position at which each of the plurality of grippers are closed,
    wherein the suction device track comprises a turning point in a zone of the front end of the stack support and wherein the suction device track, at least in a zone of said turning point, is oriented essentially perpendicular to the main surfaces of the stacked articles, and wherein a part of the suction device track leading away from the turning point branches off towards the transfer position, intersecting with the gripper track and then extending to a side of the gripper track opposite a side where the stack support is located, such that the suction device is capable of separating from the front end of the stack one article at a time and accelerating the article in an upward direction which is parallel to the main surface of the article in the conveying away direction,
    wherein the plurality of grippers of the gripper conveyor are driven at a constant speed in the upward conveying away direction and are synchronized with the suction device for each gripper to take over from the suction device one separated and accelerated article in the transfer position, wherein at the transfer position the article has an upward velocity component, provided by the suction device, in the conveying away direction, and
    wherein the gripper track at the transfer position is generally parallel to the orientation of the main surface of the articles as supported by the stack support.

2. The device according to claim 1, wherein said part of the suction device track leading away from the turning point intersects with the track of the gripper conveyor at the transfer position.

3. The device according to claim 2, wherein a distance between the transfer position and the front end of the stack support is adjustable.

4. The device according to claim 1, wherein the suction device track defines a closed circulation path, and the at least one suction device is a plurality of suction devices, all of said plurality of suction devices (5.1, 5.2) being capable to move along the suction device track.

5. The device according to claim 4, wherein the suction device track forms a triangle having concavely curved sides, a zenith of the triangle being the turning point, and wherein two further turning points are arranged beyond the transfer position.

6. The device according to claim 1, wherein, for supporting the articles to be conveyed away, the device further comprises supporting means synchronized with the gripper conveyor.

7. The device according to claim 6, wherein the supporting means are driven supporting belts with lifting cogs, and wherein the supporting belts, at least in a conveying-away zone, run parallel to the gripper conveyor.

8. The device according to claim 7, wherein the grippers are pressing elements capable of being pressed against one of the supporting belts.

9. The device according to claim 8, wherein the pressing elements are arranged on a driven gripper belt.

10. The device according to claim 1, and further comprising stabilization means for stabilizing the front end of the stack.

11. The device according to claim 10, wherein the stabilization means is at least one of lateral brushes and a foot.

12. The device according to claim 1, wherein the turning point of the suction device track is located beyond the front end of the stack, in a direction perpendicular to the main surfaces of the articles, such that the suction device is pressed into the stack or against a front-most article before the front-most article is separated from the stack.

13. The device of claim 1, wherein a branch of the suction device track serving for transfer of the article is bent from a direction perpendicular to the main surfaces of the articles to a direction with a component parallel to the conveying away direction.

14. The device according to claim 1, wherein the suction device track comprises a further turning point which is at a greater distance from the front end of the stack than the transfer position.

15. A device for separating flat articles from a lying stack, in which the articles stand on one edge lined-up one behind the other with article main surfaces aligned in parallel, the device comprising:
    a stack support configured to support articles in a consistent orientation, standing on one edge and lined-up one behind the other, with main surfaces of the articles aligned in parallel, the stack support having a stationary front end,
    means for feeding the articles towards the front end of the stack support,
    at least one suction device arranged for separating the articles from the stack via attachment to the main surface of an article, the suction device being capable of moving along a suction device track, and
    a gripper conveyor comprising a plurality of grippers arranged for conveying away the articles upward after separation from the stack, and moving in an upward conveying away direction along a gripper track, wherein the gripper track comprises a transfer position at which each of the plurality of grippers are closed,
    wherein the suction device track comprises a turning point in a zone of the front end of the stack support and wherein the suction device track, at least in a zone of said turning point, is oriented essentially perpendicular to the main surfaces of the articles, and wherein a part of the suction device track leading away from the turning point branches off towards the transfer position, and intersects with the gripper track in a region of the transfer position such that the suction device is capable of separating from the front end of the stack one article at a time and accelerating the article in an upward direction which is parallel to the main surface of the article in the conveying away direction, wherein the plurality of grippers of the gripper conveyor are driven at a constant speed in the upward conveying away direction and are synchronized with the suction device for each gripper to take over from the suction device one separated and accelerated article in the transfer position, wherein at the transfer position the article has an upward velocity component, provided by the suction device, in the conveying away direction, and wherein the suction device, when moving at all positions along the suction device track between the stack support and transfer position is oriented such that the article held therein is parallel to the orientation of the main surfaces of articles as supported by the stack support.

16. The device according to claim 15, wherein the transfer position is arranged at a higher location than the front end of the stack support and wherein the suction device track leading away form the turning point branches off toward the transfer position in the upward direction.

* * * * *